US009743585B2

(12) United States Patent
Buchmann et al.

(10) Patent No.: US 9,743,585 B2
(45) Date of Patent: Aug. 29, 2017

(54) MOWER SPINDLE BRAKE DISENGAGEMENT MECHANISM

(71) Applicant: Deere & Company, Moline, IL (US)

(72) Inventors: Andrew N. Buchmann, Durham, NC (US); Sean P. Elmore, Clayton, NC (US); Andrew J. Phy, Apex, NC (US)

(73) Assignee: DEERE & COMPANY, Moline, IL (US)

( * ) Notice: Subject to any disclaimer, the term of this patent is extended or adjusted under 35 U.S.C. 154(b) by 424 days.

(21) Appl. No.: 14/330,656

(22) Filed: Jul. 14, 2014

(65) Prior Publication Data
US 2016/0007529 A1 Jan. 14, 2016

(51) Int. Cl.
| F16D 51/00 | (2006.01) |
| A01D 34/82 | (2006.01) |
| F16D 49/00 | (2006.01) |
| F16D 65/28 | (2006.01) |
| F16C 1/10 | (2006.01) |
| F16D 121/16 | (2012.01) |
| F16D 125/60 | (2012.01) |

(52) U.S. Cl.
CPC .......... A01D 34/828 (2013.01); F16D 49/00 (2013.01); F16D 65/28 (2013.01); F16C 1/106 (2013.01); F16D 2121/16 (2013.01); F16D 2125/60 (2013.01)

(58) Field of Classification Search
CPC .. F16D 2125/60; F16D 2125/64; F16D 55/02; A01D 2101/00; A01D 34/44; A01D 34/6812; A01D 69/10; A01D 34/63
USPC .......................................................... 188/74
See application file for complete search history.

(56) References Cited

U.S. PATENT DOCUMENTS

| 3,460,325 A | | 8/1969 | Musgrave | |
| 4,068,452 A | | 1/1978 | Schaefer et al. | |
| 4,159,613 A | | 7/1979 | Knudson et al. | |
| 4,195,466 A | * | 4/1980 | Heismann | A01D 34/6812 56/10.5 |
| 4,213,288 A | | 7/1980 | Takeuchi et al. | |
| 4,558,558 A | * | 12/1985 | Horner, Jr. | A01D 34/6806 180/19.3 |
| 4,813,215 A | | 3/1989 | Chase et al. | |
| 4,893,368 A | * | 1/1990 | Ward | A47L 11/282 15/79.2 |
| 5,077,959 A | * | 1/1992 | Wenzel | A01D 34/6806 180/19.1 |
| 5,138,824 A | * | 8/1992 | Oshima | A01D 34/6806 56/10.2 R |

(Continued)

FOREIGN PATENT DOCUMENTS

JP FR 2790908 A1 * 9/2000 .......... A01D 43/063

OTHER PUBLICATIONS

Search Report in foreign counterpart application No. GB1511623.9 dated Dec. 21, 2015 (4 pages).

*Primary Examiner* — Anna Momper
*Assistant Examiner* — Mahbubur Rashid

(57) ABSTRACT

A mower spindle brake disengagement mechanism includes belt driven pulleys on spindles supported by a rotary mower deck, brakes adjacent the pulleys, each of the brakes on a pivot arm biased to a brake engaged position, and a plurality of Bowden cables, each Bowden cable connected between one of the pivot arms and a single lever that may be pivoted to retract the Bowden cables to move the brakes on the pivot arms to a brake disengaged position.

11 Claims, 2 Drawing Sheets

(56) References Cited

U.S. PATENT DOCUMENTS

| | | | | |
|---|---|---|---|---|
| 5,355,662 | A | * | 10/1994 | Schmidt .............. A01D 34/6812 180/19.3 |
| 5,526,635 | A | | 6/1996 | Wilder, Jr. |
| 5,761,891 | A | * | 6/1998 | Ferrari ................... A01D 34/66 56/17.5 |
| 6,065,276 | A | * | 5/2000 | Hohnl .................. A01D 34/005 56/320.1 |
| 6,073,430 | A | * | 6/2000 | Mullet ................. A01D 34/685 56/12.8 |
| 6,085,502 | A | * | 7/2000 | Wians ................ A01D 34/6812 56/11.3 |
| 6,185,920 | B1 | * | 2/2001 | Oxley ................... A01D 34/66 56/14.7 |
| 6,192,666 | B1 | * | 2/2001 | Sugden ................ A01D 43/077 56/13.6 |
| 7,553,248 | B2 | | 6/2009 | Busboom et al. |
| 8,312,948 | B1 | * | 11/2012 | Carrington ............. B60T 1/062 180/6.48 |
| 2002/0083696 | A1 | | 7/2002 | Komorida et al. |
| 2011/0083412 | A1 | * | 4/2011 | Jackson ................ A01D 69/10 56/11.3 |
| 2012/0137644 | A1 | * | 6/2012 | Carlsson ................ A01D 34/81 56/15.6 |

* cited by examiner

MOWER SPINDLE BRAKE DISENGAGEMENT MECHANISM

FIELD OF THE INVENTION

This invention relates to grass mowing machines, and more specifically to a mower spindle brake disengagement mechanism.

BACKGROUND OF THE INVENTION

Many grass mowing machines with multi-spindle rotary mower decks have mower spindle brakes. Mower spindle brakes may be designed to engage and stop rotation of each spindle and blade under certain conditions. For example, each mower spindle brake may be on a pivoting arm and may engage the perimeter of a mower spindle pulley to stop its rotation within a short period of time. Mower spindle brakes also may be spring biased to the engaged position.

To release mower spindle brakes, grass mowing machines may have a brake disengagement mechanism. For example, an attachment engagement lever near the operator seat may be used to disengage mower spindle brakes at the same time as it moves an idler pulley to tighten a drive belt to engage the mower spindle pulleys. The attachment engagement lever may be connected to one of the mower spindle brakes with a cable. An additional mechanical linkage is needed from that mower spindle brake to one or more additional mower spindle brakes on the mower deck. For example, the mechanical linkage may be a rigid rod or wire form to provide proper mechanical advantages to satisfy force requirements of the disengagement system.

Recently, some grass mowing machines with multi-spindle rotary mower decks have been designed for rear discharge and rear collection of grass clippings. A rear discharge/rear collection chute may extend through the top surface of the mower deck and rearwardly over the deck. However, the rear discharge/rear collection chute blocks conventional mechanical linkages between mower spindle brakes, including rods or wire forms that can satisfy force requirements. Without suitable mechanical linkages, some rear discharge/rear collection mowers have included higher cost mechanisms that include one or more electromagnets connected to the mower clutch to stop rotation, instead of mower spindle brakes. Other rear discharge/rear collection mowers have used mechanical clutching mechanisms without brakes. A low cost non-electric mower spindle brake disengagement mechanism is needed for multi-spindle rotary mower decks with rear discharge/rear collection.

SUMMARY OF THE INVENTION

A mower spindle brake disengagement mechanism on a rotary mower deck supporting a plurality of generally vertical spindles rotated by an endless belt. A grass clippings discharge and collection chute is between the plurality of spindles and extends rearwardly from the rotary mower deck. The mechanism includes a plurality of cables extending between an attachment engagement lever and a plurality of pivot arms on the rotary mower deck. The attachment engagement lever retracts each of the cables to disengage each of the spindle brakes.

DESCRIPTION OF THE PREFERRED EMBODIMENT

Figure 1:
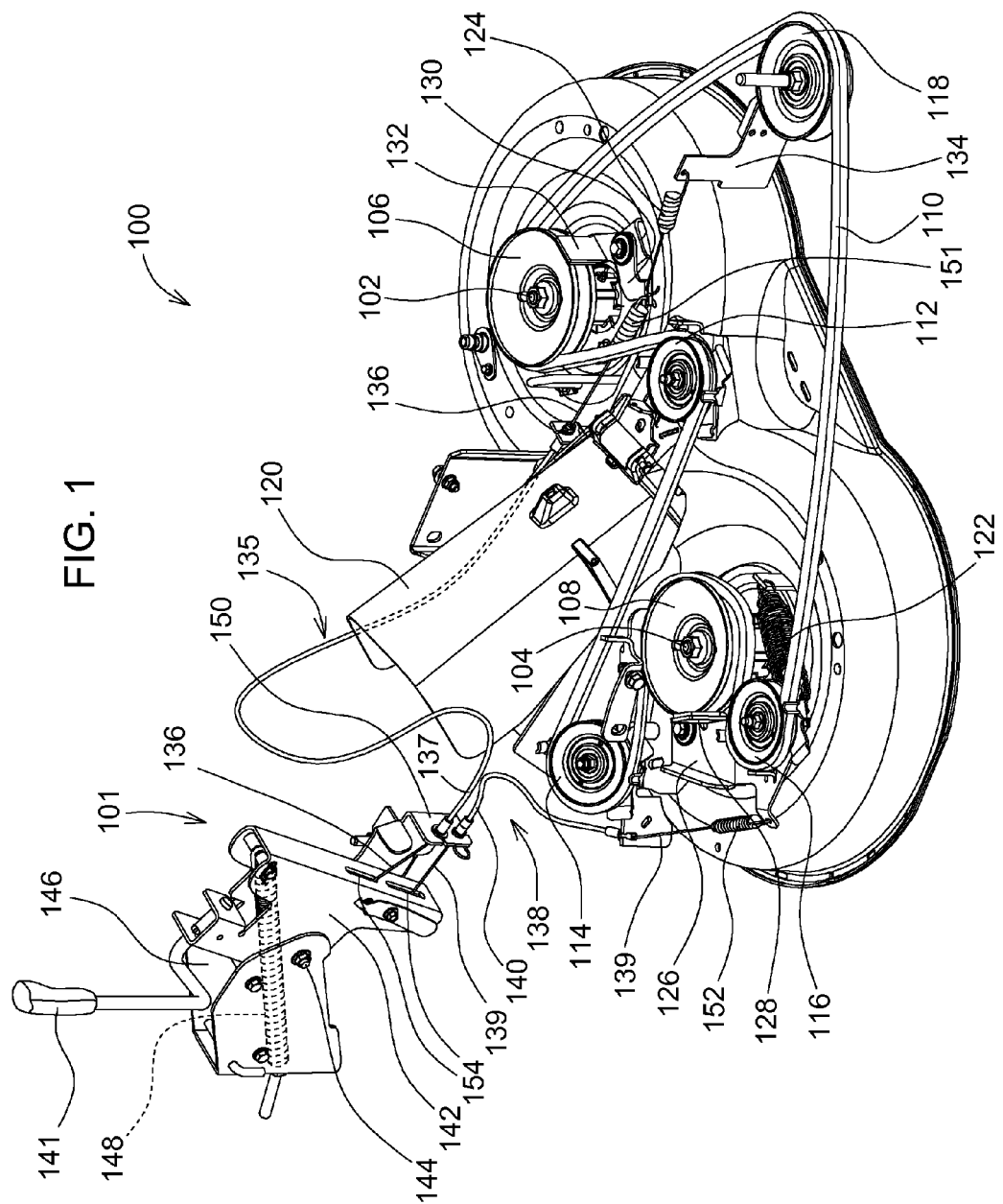
FIG. 1 is a perspective view of a mower spindle brake disengagement mechanism in the brake engaged position on a rotary mower deck, according to a preferred embodiment of the invention.
Figure 2:
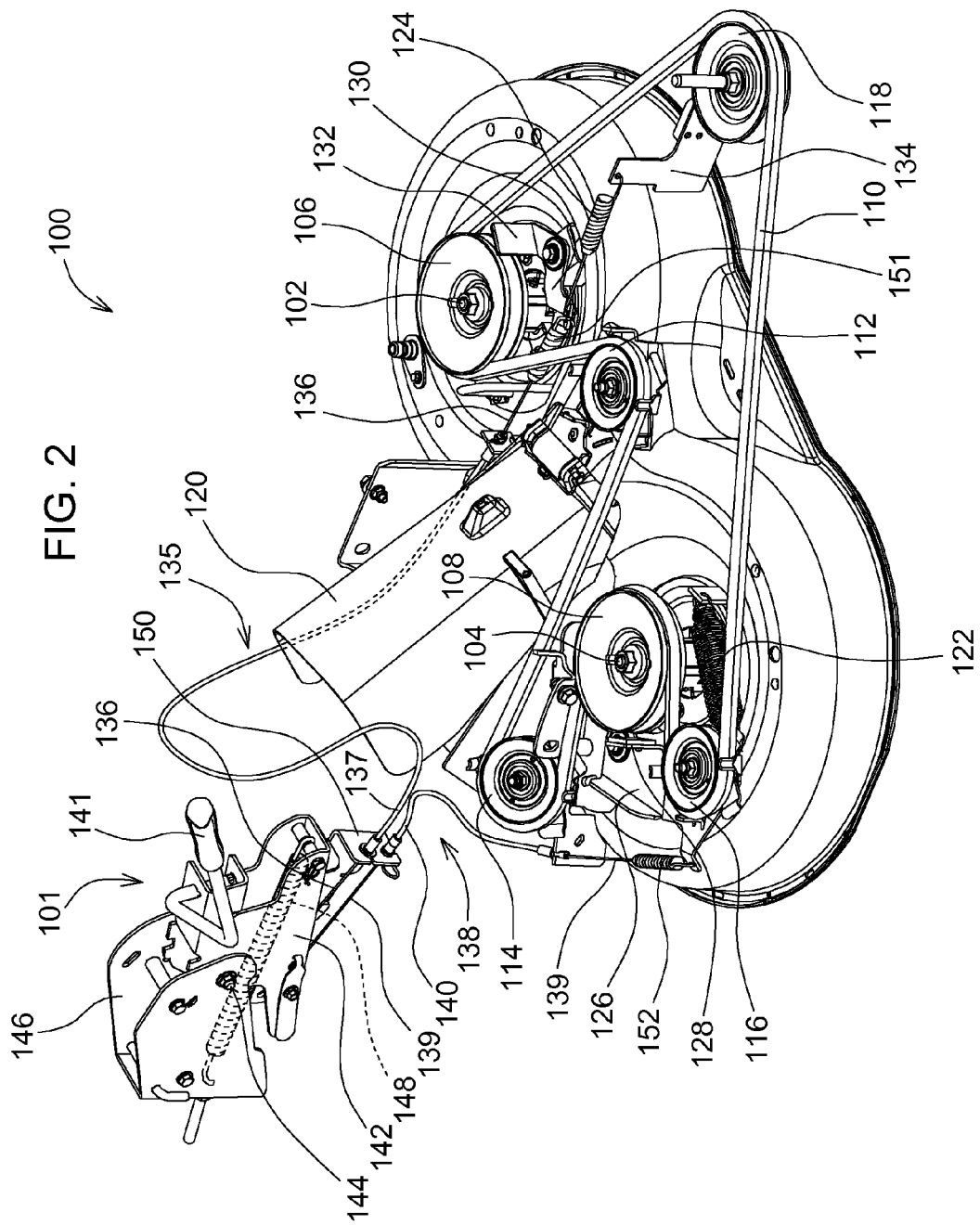
FIG. 2 is a perspective view of a mower spindle brake disengagement mechanism in the brake disengaged position on a rotary mower deck, according to a preferred embodiment of the invention.

In the embodiment of FIGS. 1-2, mower spindle brake disengagement mechanism 101 may be used on multi-spindle rotary mower deck 100 supporting first spindle 102 and second spindle 104. Pulley 106 is mounted on first spindle 102 above the deck, and a rotary cutting blade is mounted to a lower end of the first spindle under the deck. Pulley 108 is mounted on second spindle 104 above the deck, and a rotary cutting blade is mounted to a lower end of the second spindle under the deck. The first and second spindles may be rotated by endless belt 110, which may be a rubber with a conventional cross section. Belt 110 also may be wrapped around front center pulley 112, reverser pulley 114, idler pulley 116, and drive pulley 118 which may be powered and rotated by an internal combustion engine or other power supply such as storage batteries or fuel cells. Reverser pulley 114 may be used so that the first and second spindles rotate in opposite directions. Idler pulley 116 may be mounted to pivot arm 126. Pivot arm 126 may be mounted on the top of the rotary mower deck to be capable of movement between the position of FIG. 1 where idler pulley 116 does not engage belt 110, and FIG. 2 where the idler pulley engages and tightens the belt to transmit rotational power from drive pulley 118 to spindle pulleys 106 and 108.

In one embodiment, mower spindle brake disengagement mechanism 101 may be provided on rear discharge/rear collection mower deck 100 having two adjoining cutting chambers enclosing two cutting blades attached to the first and second spindles. Discharge chute 120 may be positioned generally between the first and second spindles on the top of the mower deck, and may extend from a location between the cutting chambers partially through the deck and rearwardly to the back of the mower and/or into a rear mounted collection container or hopper. The two cutting blades may be counter rotating and propel grass clippings rearwardly through discharge chute 120. Alternatively, the rotary mower deck may have three cutting blades in three adjacent cutting chambers, in a rear discharge/rear collection configuration including a chute directed rearwardly from a center part of the deck.

In one embodiment, the mower spindle brake disengagement mechanism may be provided on rotary mower deck 100 having a first mower spindle brake 132 connected to pivot arm 130, and second mower spindle brake 128 connected to pivot arm 126. Each pivot arm 126, 130 may pivot independently on a vertical axis mounted to the top of the rotary mower deck. Each pivot arm 126, 130 may move a spindle brake 128, 132 between the brake engaged position against the outer circumferences of the spindle pulleys as shown in FIG. 1, and the brake disengaged position of FIG. 2. Coil spring 124 may be connected between pivot arm 130 and bracket 134, and may bias pivot arm 130 toward the brake engaged position of FIG. 1. Coil spring 122 may be connected to pivot arm 126, and may bias pivot arm 126 toward the brake engaged position of FIG. 1, and also bias idler pulley 116 out or away from engagement of belt 110.

In one embodiment, mower spindle brake disengagement mechanism 101 may include a pair of cables 135, 138 for disengaging the first and second mower spindle brakes. First cable 135 may be used for disengaging first mower spindle brake 132, and second cable 138 may disengage second mower spindle brake 128. Each of the first and second cables 135, 138 may be pulled or retracted by use of a single attachment engagement lever 141. Attachment engagement lever 141 may be pivoted about 90 degrees between the two positions, from the brake engaged position of FIG. 1 to the brake disengaged position of FIG. 2. Attachment engagement lever 141 may be attached to lever pivot member 142 mounted on pivot axis 144 to lever housing 146. Lever housing 146 may be secured to the frame or body of the grass mowing machine. Attachment engagement lever 141 may be urged into either the spindle brake engaged position or the disengaged position by over center coil spring 148 between the lever pivot member and lever housing.

In one embodiment, the first and second cables 135, 138 of the mower spindle brake disengagement mechanism may be Bowden cables having an inner cable inside a hollow outer cable housing. The Bowden cables may be routed around each side of the rear discharge/rear collection chute. A first or upper end of each of the pair of inner cables 136, 139 may be separately attached to one of a pair of slots 154 in lever pivot member 142. A first or upper end of each of the pair of hollow outer cable housings 137, 140 may be attached to bracket 150 that may be secured to the frame or body of the grass mowing machine. The second or lower end of each inner cable may be attached through a coil spring 151, 152 to one of pivot arms 130, 126 respectively. When the inner cables are retracted, each coil spring 151, 152 may exert a force to disengage the spindle brake that exceeds the force of coil springs 124, 122 urging the spindle brakes into engagement.

In one embodiment, the mower spindle brake disengagement mechanism may allow each of the brakes to be disengaged independently, with the timing of disengagement depending on the amount (length) that each cable is retracted by attachment engagement lever 141, and the tension of the cable. For example, when the attachment engagement lever is pivoted about ninety degrees from the brake engaged to disengaged position, first inner cable 136 may be retracted about 40 to 50 mm and inner cable 139 may be retracted a significantly greater amount, about 120 to 130 mm. Additionally, the first inner cable 136 may have lower tension than inner cable 139.

Having described the preferred embodiment, it will become apparent that various modifications can be made without departing from the scope of the invention as defined in the accompanying claims.

The invention claimed is:

1. A mower spindle brake disengagement mechanism, comprising:
   a rotary mower deck supporting a plurality of generally vertical mower blade spindles rotated by an endless belt, and having a grass clippings discharge and collection chute between the plurality of spindles and extending rearwardly from the rotary mower deck;
   a plurality of cables extending between a single attachment engagement lever and a plurality of pivot arms on each side of the chute on the rotary mower deck;
   a plurality of spindle brakes, with one of the spindle brakes on each of the pivot arms, and each spindle brake independently biased to a brake engaged position against a pulley on one of the spindles;
   the attachment engagement lever retracting each of the plurality of cables to independently disengage each of the plurality of spindle brakes;
   wherein the attachment engagement lever retracts each of the plurality of cables a different length.

2. The mower spindle brake disengagement mechanism of claim 1 further comprising a coil spring between each cable and each pivot arm.

3. The mower spindle brake disengagement mechanism of claim 1 wherein the cables are Bowden cables.

4. The mower spindle brake disengagement mechanism of claim 1 wherein the attachment engagement lever engages the endless belt to rotate the spindles when the spindle brakes are disengaged.

5. A mower spindle brake disengagement mechanism, comprising:
   a first spindle brake on a first side of a rear discharge chute on a rotary mower deck; the first spindle brake biased to a brake engaged position and moveable to a brake disengaged position by retracting a first Bowden cable connected to a pivot arm on the first side of the rear discharge chute;
   a second spindle brake on a second side of the rear discharge chute on the rotary mower deck; the second spindle brake biased to a brake engaged position and moveable to a brake disengaged position by retracting a second Bowden cable connected to a pivot arm on the second side of the rear discharge chute; and
   an attachment engagement lever connected to the first and the second Bowden cables and retracting one of the Bowden cables further than the other Bowden cable to move the pivot arms and disengage the first and second spindle brakes.

6. The mower spindle brake disengagement mechanism of claim 5 wherein the attachment engagement lever is pivotable ninety degrees to retract the first and second Bowden cables to disengage the first and second spindle brakes.

7. The mower spindle brake disengagement mechanism of claim 5 further comprising first and second coil springs between the first and second Bowden cables and the spindle brakes.

8. The mower spindle brake disengagement mechanism of claim 5 further comprising an endless belt driving a first spindle and a second counter-rotating spindle when the attachment engagement lever retracts the first and second Bowden cables to disengage the first and second spindle brakes.

9. A mower spindle brake disengagement mechanism, comprising:
   a plurality of belt driven pulleys on spindles supported by a rotary mower deck;
   a plurality of brakes adjacent the pulleys, each of the brakes on a pivot arm biased independently to a brake engaged position;
   a plurality of Bowden cables, each Bowden cable connected between one of the pivot arms and a single lever that may be pivoted to retract each of the plurality of Bowden cables to move the brakes on the pivot arms independently to a brake disengaged position;
   wherein the lever retracts each of the plurality of Bowden cables a different length.

10. The mower spindle brake disengagement mechanism of claim 9, wherein each of the brakes engages one of the spindles.

11. The mower spindle brake disengagement mechanism of claim 9, further comprising a rear discharge chute between the belt driven pulleys.

* * * * *